United States Patent
Sharples

(10) Patent No.: US 6,929,303 B1
(45) Date of Patent: Aug. 16, 2005

(54) TRUCK BED STORAGE APPARATUS AND TONNEAU COVER

(75) Inventor: Thomas M. Sharples, 8621 Woodsman Dr., Washington, MI (US) 48094

(73) Assignee: Thomas M. Sharples, Washington, MI (US)

( * ) Notice: Subject to any disclaimer, the term of this patent is extended or adjusted under 35 U.S.C. 154(b) by 0 days.

(21) Appl. No.: 10/718,243

(22) Filed: Nov. 20, 2003

Related U.S. Application Data

(60) Provisional application No. 60/428,058, filed on Nov. 21, 2002.

(51) Int. Cl.[7] .................................................. B60P 7/02
(52) U.S. Cl. ............................. 296/37.6; 296/100.05; 296/100.06; 296/100.08; 296/100.1; 296/136.04
(58) Field of Search ......................... 296/37.6, 100.02, 296/100.05, 100.06, 100.08, 100.1, 136.03, 296/136.04

(56) References Cited

U.S. PATENT DOCUMENTS

| | | | |
|---|---|---|---|
| 4,844,305 A * | 7/1989 | McKneely | 224/404 |
| 4,948,169 A | 8/1990 | Amundson | |
| 5,207,470 A * | 5/1993 | Rafi-Zadeh | 296/37.7 |
| 5,303,969 A | 4/1994 | Simnacher | |
| 5,398,987 A | 3/1995 | Sturgis | |
| 5,564,767 A | 10/1996 | Strepek | |
| 5,964,495 A * | 10/1999 | Blanton | 296/100.02 |
| 6,012,754 A | 1/2000 | Clare et al. | |
| 6,024,402 A | 2/2000 | Wheatley | |
| 6,030,018 A | 2/2000 | Clare et al. | |
| 6,033,002 A | 3/2000 | Clare et al. | |
| 6,102,474 A | 8/2000 | Daley | |
| 6,129,401 A | 10/2000 | Neag et al. | |
| 6,224,140 B1 | 5/2001 | Hoplock | |
| 6,276,736 B1 | 8/2001 | Cook et al. | |
| 6,325,439 B1 * | 12/2001 | Crossman | 296/37.6 |
| 6,328,366 B1 | 12/2001 | Foster et al. | |
| 6,349,865 B1 | 2/2002 | Tolley et al. | |
| 6,375,054 B1 | 4/2002 | Lance et al. | |
| 6,412,847 B2 | 7/2002 | De Gaillard | |
| 6,422,567 B1 | 7/2002 | Mastrangelo et al. | |
| 6,499,795 B2 | 12/2002 | Clare | |
| 6,513,851 B2 | 2/2003 | Henderson | |
| 6,572,168 B1 * | 6/2003 | Radstake | 312/247 |
| 6,634,691 B2 * | 10/2003 | Henderson | 296/37.6 |
| 6,769,731 B1 * | 8/2004 | Myers et al. | 296/100.09 |
| 2001/0050491 A1 | 12/2001 | Clare et al. | |
| 2002/0057001 A1 | 5/2002 | Wilding | |
| 2002/0089202 A1 | 7/2002 | Henderson | |
| 2003/0189353 A1 * | 10/2003 | Moore | 296/37.6 |
| 2004/0164578 A1 * | 8/2004 | Mack et al. | 296/26.04 |

* cited by examiner

*Primary Examiner*—Jason Morrow
(74) *Attorney, Agent, or Firm*—Young & Basile, P.C.

(57) ABSTRACT

An article storage receptacle is mountable in a truck bed. A storage compartment is supported by a pivotal frame coupled to a moving unit for moving the frame and the storage compartment between a first position overlaying the truck bed to a variably selected second position elevated from the first position opening the interior of the storage compartment to access. A tonneau cover is pivotally mounted on the frame. An article carrier is carried by the tonneau cover.

33 Claims, 12 Drawing Sheets

TRUCK BED STORAGE APPARATUS AND TONNEAU COVER

CROSS REFERENCE TO CO-PENDING APPLICATION

This application claims the benefit of and priority to the filing date of provisional patent application Ser. No. 60/428,058 filed Nov. 21, 2002, and entitled 'TRUCK BED STORAGE RECEPTACLE AND TONNEAU, the contents of which are incorporated herein in its entirety.

BACKGROUND

Trucks are designed to carry cargo, or articles of many different sizes, shapes and numbers. However, small and/or lightweight articles placed in the bed of a truck, such articles are prone to movement during operation of the truck. In addition, articles placed in the bed of the truck are exposed to view and the environment, leading to the possibility of theft, damage, etc.

To address this concern, numerous enclosures, such as tool boxes, as well as cargo nets and other compartment dividers, have been designed to prevent movement of articles disposed within a truck bed as well as to cover and lockably secure the articles in the truck bed when not in use.

In the case of tool boxes, the tool boxes are typically mounted at the forward end of the truck bed immediately behind the cab. Such tool boxes have one or more pivotal covers or lids which may pivot upward from a horizontal pivot extending laterally across the truck bed or up from the side about a centrally located hinge extending along the longitudinal center line of the truck bed.

While such tool boxes securely retain tools and other objects within a truck bed from movement and theft, access to all interior portions of the tool box is limited, due to the size, namely height and width of most truck beds. In fact, the only practical way to access all portions of a tool box mounted in a truck bed behind the truck cab, is to climb up onto the truck bed and walk the length of the truck bed to the tool box. This becomes a tiresome task for workers who frequently access a truck mounted tool box many times each work day.

Thus, it would be desirable to provide a truck bed storage apparatus which contains and secures articles from movement and theft. It would also be desirable to provide a truck bed storage receptacle which is capable of movement between a lower, storage position and a raised or elevated position facilitating easy access to all interior portion of the apparatus storage compartment. It would also be desirable to provide a truck bed storage apparatus in which the individual storage compartment(s) can be removed or to a smaller volume to enable cargo to be placed in the truck bed. It would also be desirable to provide a truck bed storage receptacle which can be incorporated with a tonneau cover.

SUMMARY

In one aspect, the present invention is an article storage apparatus mountable in a truck bed.

The article storage apparatus includes a storage compartment means supported on the truck bed and means, coupled to the storage compartment means, for moving the storage compartment means between a first, lowered storage position with respect to the truck bed and a variably selectable second position elevated from the first position to allow easier access to the interior of the storage compartment means.

The apparatus further includes pivot means for pivotally mounting the storage compartment means to the truck and to the moving means.

The storage compartment means includes a frame and a storage compartment.

The apparatus includes movement assist means, coupled to the frame, for assisting movement of the frame between the first and second positions. The movement assist means can be at least one pressurized gas cylinder coupled to the frame.

The moving means includes a rack stationarily positioned with respect to the storage compartment means and having an extensible member, a drive gear and an electric motor coupled to the drive gear for bi-directionally moving the extensible member of the stationary rack.

In another aspect the moving means is a rack coupled to the storage compartment means, the rack having an extensible member. A manually operated crank moves the rack to bi-directionally move the extensible member and the attached frame.

In another aspect the moving means is a receiver attached to the frame for receiving a lift bar to allow manual pivoting of the frame between the first and second positions.

In another aspect, the storage compartment means is a rigid or flexible walled container mounted either permanently or removably to the frame.

In another aspect, the storage compartment means is a collapsible storage compartment including a plurality of inter-engageable panels. The panels are disengagable and movable to a nesting position in the frame.

In another aspect, one or more dividers are mountable in the storage compartment to divide the storage compartment into several, smaller sections.

In another aspect, the storage compartment means includes a frame having at least one open section, and a removable storage compartment mountable in the at least one open section. Mounts are fixed on the frame or on the storage containers for releasably supporting at least one storage container in the at least one section of the frame.

In another aspect, the storage compartment means is a pair of separate storage compartment means, each independently moveably mountable above the truck bed.

The present invention is also a tonneau cover mountable on a truck bed. In one aspect, the tonneau cover includes an article carrier means mounted on or carried by the cover for supporting an article on the tonneau cover.

The article carrier means may be separate support elements fixedly mounted on the external surface of the tonneau cover, and/or integral molded with the tonneau cover or the article carrier means may include a portion homogeneously formed with the cover, such as an open-ended channel formed in the cover and extending above or below the plane of the cover for receiving and supporting at least a portion of an article therein. Tiedown means may be employed for releasably securing an article in the article carrier means.

The article storage apparatus of the present invention afford many advantages over previously devised article compartments or storage apparatus devised for trucks. First, the article storage apparatus of the present invention can be conveniently mounted in a truck bed and, due to its elevatable features, can be raised to a position affording easy access to the entire interior of the storage compartment for loading and unloading articles to and from the storage compartment. A separate cover, such as a tonneau cover, is associated with the article storage means and is moveable from a first position overlaying and closing the article storage means from external access to a second position spaced from an open end of the article storage means to permit access to the interior of the article storage means. The cover not only provides protection to articles stored in the article storage means from unauthorized removal, damage and the effects of the environment, but also provides an aesthetic appearance to the truck bed by closing off the open top of the truck bed.

The cover may be a tonneau cover formed as one or two separately pivotal panels, each of which is coupled to a separate article storage means. The article carrier means uniquely carried or mounted on the tonneau affords a convenient location for mounting articles on the tonneau, which capability has not been previously provided for tonneaus.

BRIEF DESCRIPTION OF THE DRAWING

The various features, advantages and other uses of the present invention will become more apparent by referring to the following detail description and drawing in which.

DETAILED DESCRIPTION

The present invention is a truck bed storage apparatus or receptacle which is mountable in a truck bed and movable between a stowed, lowered position and one or more, variably selectable, elevated positions, as well as a tonneau cover having unique article carrier means for mounting articles, such as bikes, motorcycles, etc., thereon. The storage apparatus and the tonneau cover may be used together or separately.

Figure 1:
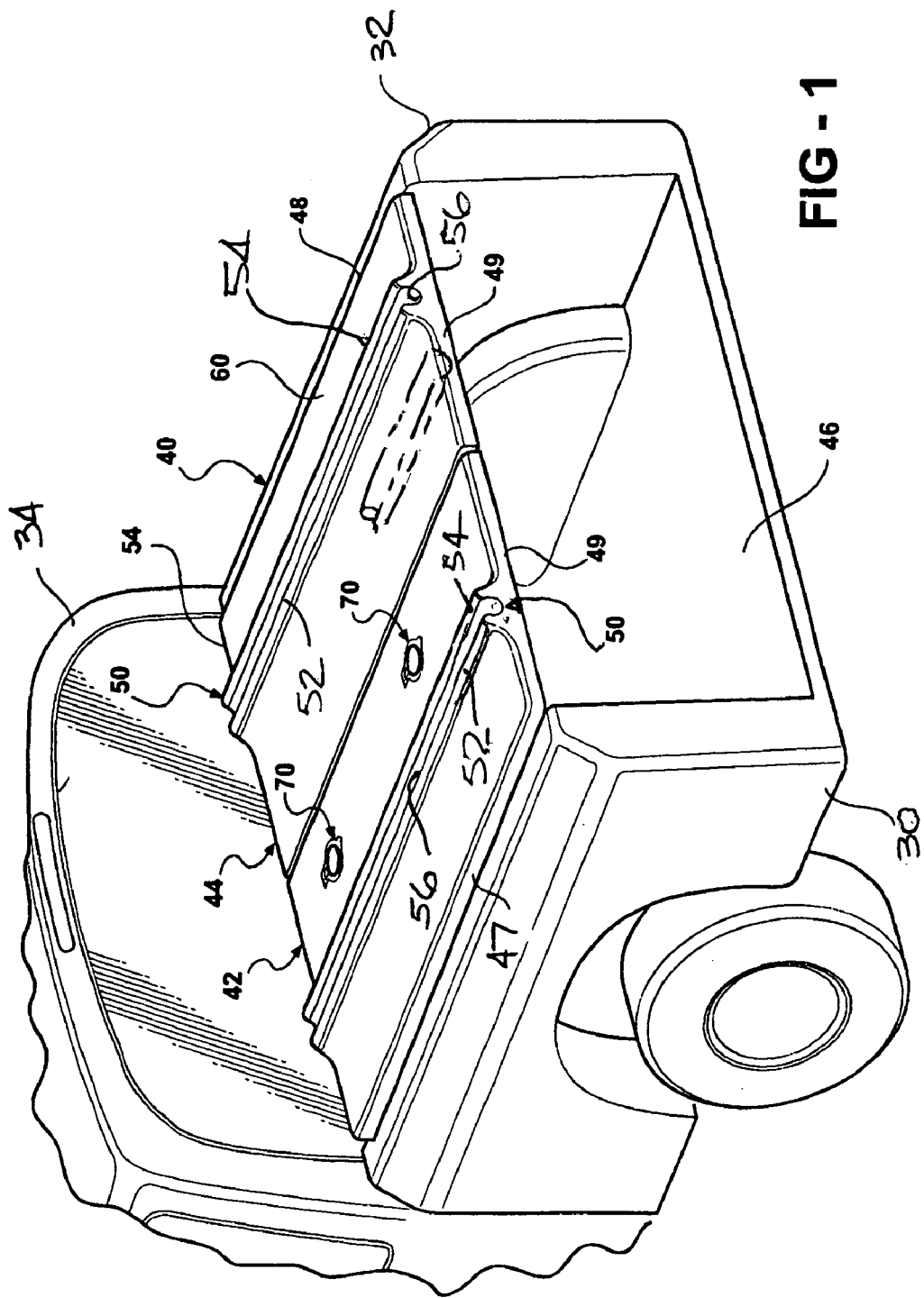
FIG. 1 is a perspective view of one aspect of a tonneau cover according to the present invention.

As shown in FIG. 1, a tonneau cover 40 according to the present invention is embodied, by way of example only, by two separately movable portions or sections including a first section 42 and a second section 44 which are substantially mirror images of each other. It will also be understood that the features of the present invention may be applied equally to a single piece tonneau spanning the entire lateral width of the truck bed 46 which pivots about one of the longitudinally extending sides 47 or 48 on hinges mounted on the truck side panels 30 and 32 or pivots about one end adjacent to the rear wall of the truck cab 34 by means of a similar hinge connected to one end of the truck bed or the truck cab 34.

The tonneau sections 42 and 44 may be constructed of any suitable material, such as metal, including steel or aluminum, for example only, as well as high strength plastics, such as reinforced fiberglass, etc.

According to the present invention, at least one and preferably two or more channel means each denoted by reference number 50, are formed in the cover 40. By example only, one channel means 50 is formed in each section 42 and 44. Each channel means 50 is formed of a generally U-shaped member defined by a pair of side walls 52 and 54 which are spanned at a lower end on the section 42 or 44 by a centrally located end wall 56. The width of the end wall 56 which defines the spacing between the side walls 52 and 54 is sized to accommodate vehicle wheels, such as motorcycle or bicycle wheels, as well as wheels on ATVs, etc.

As shown in FIG. 1, the channel means 50 is integrally or homogeneously formed as a one-piece part of each section 42 and 44. This is easily accomplished when each section 42 and 44 is formed of a molded plastic. The channel 50 can be in a raised portion extending from a plane of the sections 42 and/or 44 or be recessed into the cover section 42 and 44 below the plane of the sections 42 and 44 as shown in phantom in FIG. 1. Alternately, the channel means 50 may comprise separate U-shaped members which are fixedly attached to the otherwise generally planar surface of each section 42 and 44 by means of mechanical fasteners, such as screws, nuts and bolts, etc., as well as adhesives, etc.

Once an article, such as a bicycle or motorcycle is mounted in one or both of the channel means 50, tie down straps 70 may be employed to secure the article in place to one or more tie down means 70, one of which is shown in FIG. 1. A plurality of tie down means 70 can be provided on the tonneau 40, typically at longitudinally spaced locations along the longitudinal sides 48 of each section 42 and 44 as well as along the inside edges 49 of the sections 42 and 44.

Figure 2:
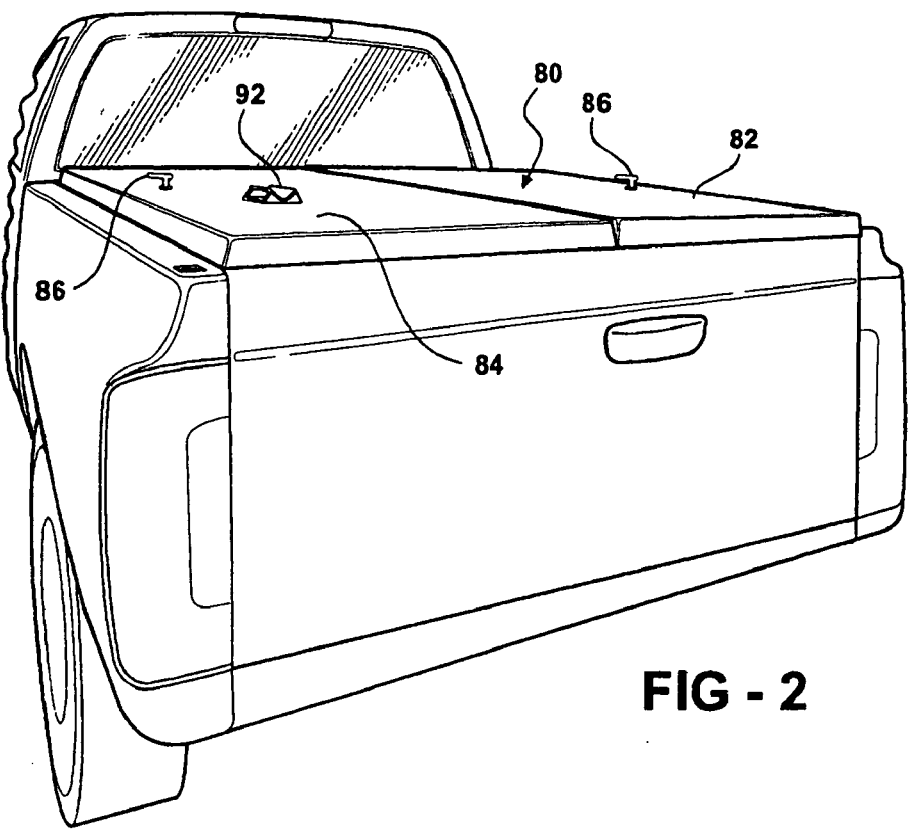
FIG. 2 is a rear perspective view of a tonneau cover and/or article storage apparatus according to another aspect of the present invention.

Referring now to FIG. 2, there is depicted another aspect of a tonneau cover 80 according to the present invention. In this aspect, the tonneau cover 80 also includes two separately moveable tonneau covers 82 and 84. As shown in FIGS. 2–5, each tonneau cover 82 and 84 is provided with a lock mechanism, such as a key lock mechanism 86. The lock mechanism 86 includes a rotatable handle mounted externally on each tonneau cover 82 and 84. The handle 86 is pivotally connected to two links mounted adjacent to the inside surface of each tonneau cover 82 and 84. The links 88 and 90 extend through lock apertures in a fixed support in the truck bed.

Also shown by way of example in FIG. 2 is an article carrier which, in this example, is devised for releasably mounting a bicycle on top of the tonneau cover 84. The article carrier includes a channel-like support 92 fixedly mounted on the tonneau cover 84, by fasteners, adhesive, etc. A releasable latch, not shown, is also mounted on a tonneau cover 84 and spaced from the support 92. The latch, not shown, includes a releasable or moveable member which can be moved to an open position allowing the front fork of a bicycle frame, with the front wheel having been removed, to be inserted and then releasably held in the latch.

Figure 3:
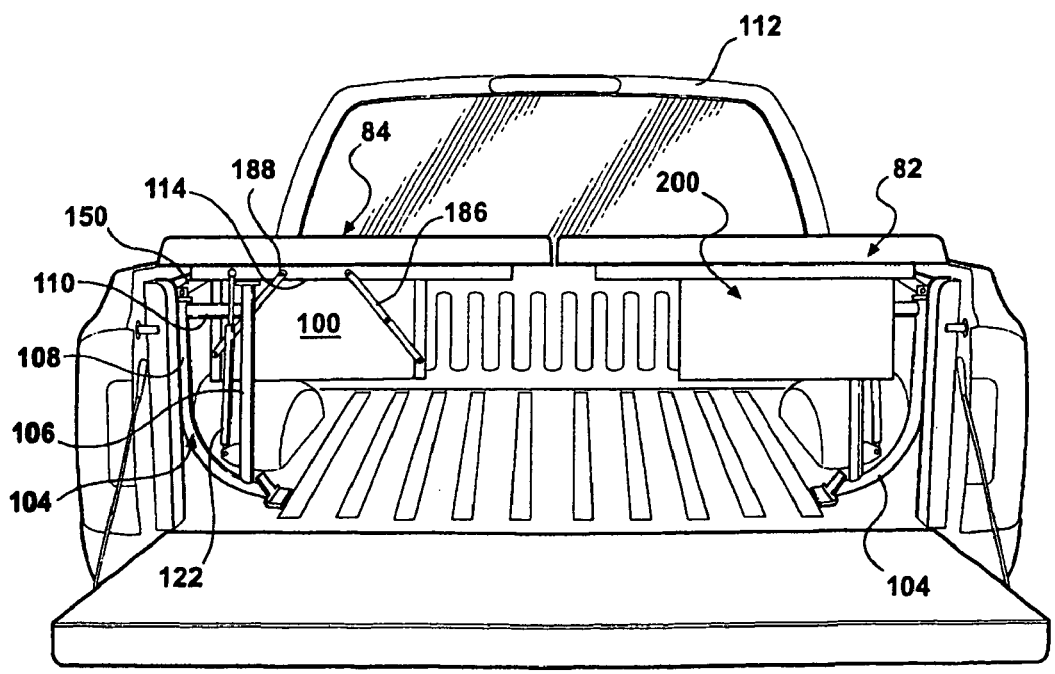
FIG. 3 is a rear end view of a truck incorporating the tonneau cover and article storage apparatus shown in FIG. 2.
Figure 4:
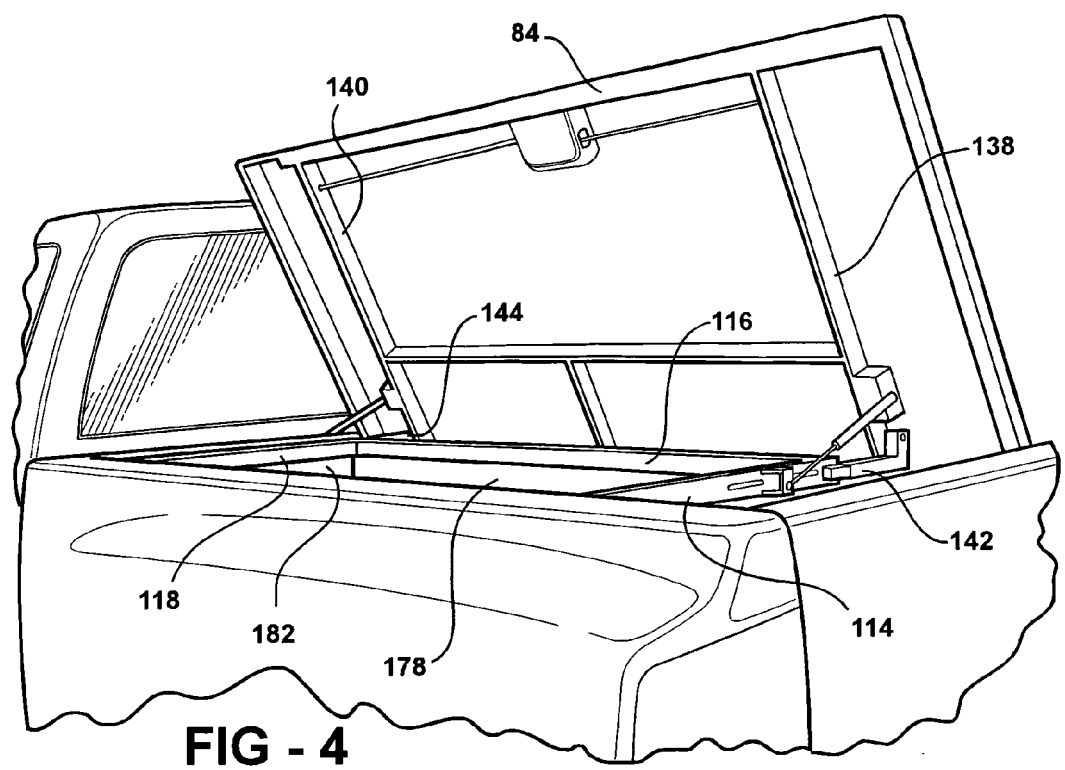
FIG. 4 is a perspective view showing the elevated position of the tonneau cover.
Figure 5:
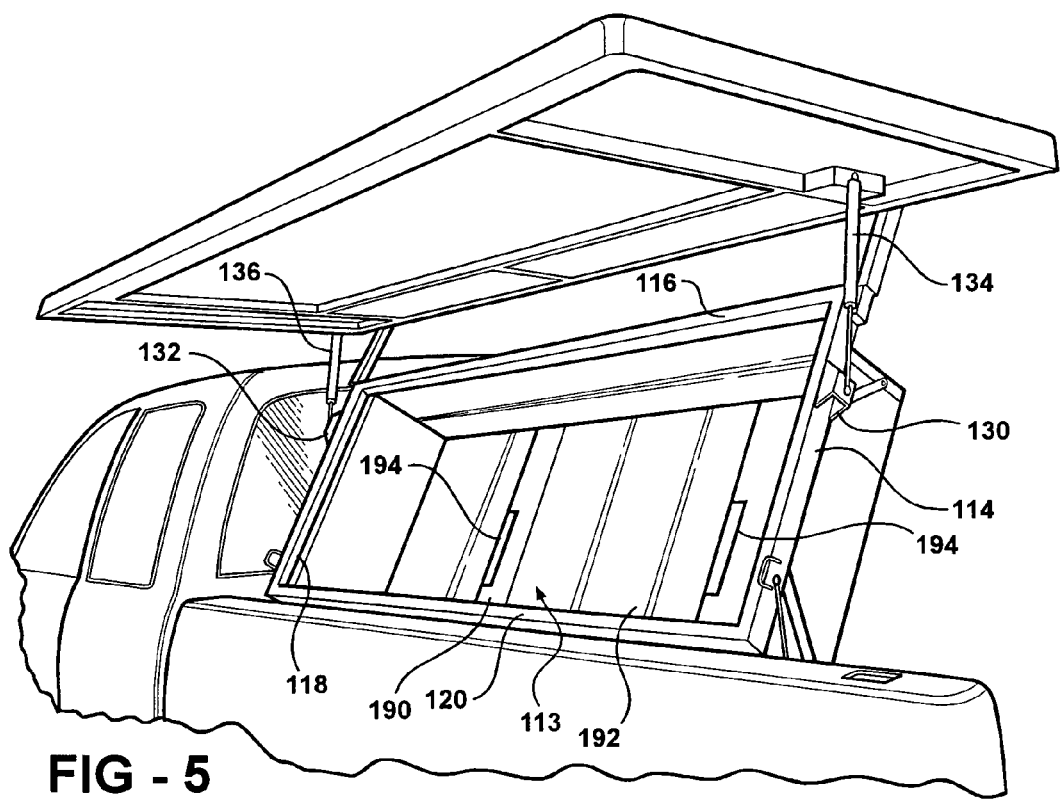
FIG. 5 is a perspective view showing the elevated position of the entire article storage apparatus and tonneau cover.

As shown in FIGS. 3–5, an article storage container or compartment 100 and 200 is associated with at least one or typically, both of the tonneau covers 82 and 84. A frame member 104 is affixed to a rear portion of the truck bed 106 by suitable fastening means, such as welds, fasteners, etc. The frame member 104 includes a pair of legs 106 and 108 joined at one end by a cross member 110. A similar frame member 104 is mounted at the other end of the truck bed 106 adjacent to a truck cab 112.

As shown in FIGS. 3–5, the article container 100, for example, includes a frame formed of frame members 114, 116, 118 and 120. The frame members 114, 116, 118 and 120 are joined at ends into a polygonal or rectangular configuration. The frame members 114, 116, 118 and 120 are joined together by suitable means, such as welds, fasteners, attachment brackets, etc. By way of example only, the frame members 114, 116, 118 and 120 may have a hollow, tubular configuration.

A lift assist means 122, FIG. 3, is provided on each frame member 104. The assist lift means can be a pressurized gas cylinder 122 which is fixed at one end to one of the legs of the frame member 104 and is pivotally attached at an opposite end to one of the article container frame members, such as frame member 114 or 118. The lift means 122 assists in elevating the frame and article container 100 as well as controlling its manual descent.

As shown in FIGS. 4 and 5, brackets 130 and 132 are mounted on the frame members 114 and 118. The brackets 130 and 132 pivotally receive one end of a second lift means 134 and 136, which can again comprise gas assist cylinders. The other end of the lift means 134 and 136 is pivotally connected to a fixed structural member, such as a cross-rib 138 mounted on the inside surface of the tonneau cover 84. The lift means 136 is similarly connected to a support rib 140 at the opposite end of the tonneau cover 74. Struts 142 and 144 are pivotally connected on one end to the structural supports 138 and 140, respectively, and fixed at an opposite end to the support members 114 and 118 respectively.

In this manner, the tonneau cover 84 is carried by the article container 100 and is separately pivotal with respect to the article container 100. The tonneau cover 84 can be moved from a first or closed position shown in FIG. 2 to a second or pivoted open position shown in FIG. 4. In the open position shown in FIG. 4, access is allowed to the interior of the article container 100. In the closed position shown in FIG. 2, the tonneau cover 84 closes and provides a lockable closure over the article container 100.

The frame members 114 and 118 are pivotally connected to the frame members 104 by pivotal links 150, see FIG. 3, which are connected between the frame members 114 and 116 and the supports 104. The connection of the links 150 to the frame or support 104 defines a pivot axis about which the frame members 114, 116, 118 and 120 pivot between a first lower position shown in FIG. 3 and a variably selectable second elevated position shown in FIG. 5. The elevated position is disposed at an angle with respect to the sidewall of the truck and affords easy access portions of the interior of the article container 100. The angle of elevation is determined by the geometry of the links 150, the drive means, etc, and can vary between 10 and about 90°. The drive means described hereafter allows pivoting to any angular elevated position as the user desires.

Figure 6:
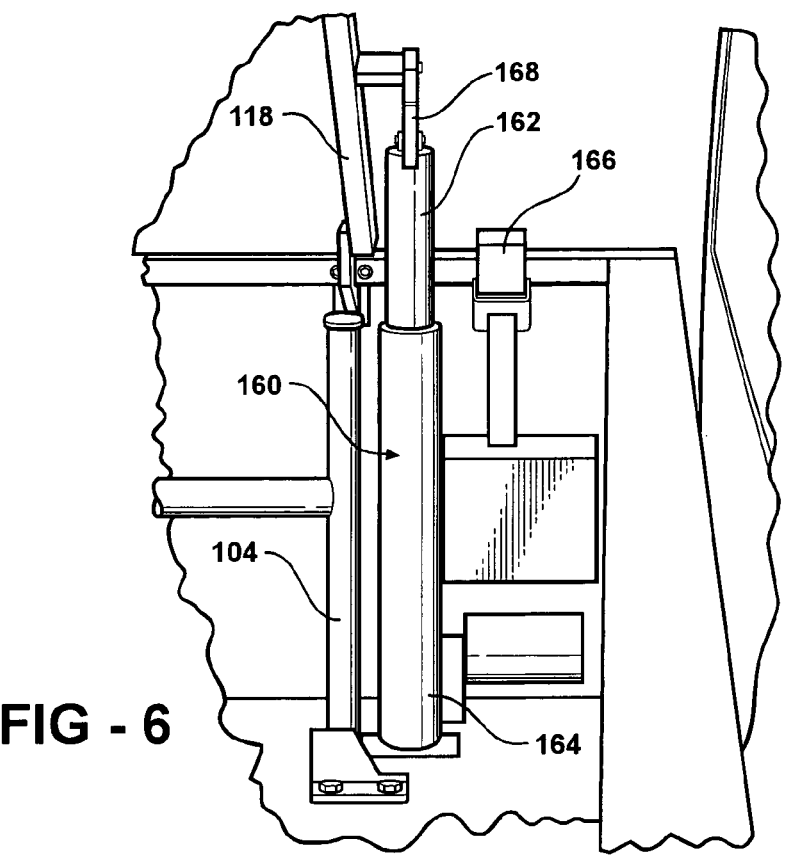
FIG. 6 is a perspective view of the power drive means employed with the article storage apparatus shown in FIG. 5.

Referring now to FIG. 6, a power drive means 160 is mounted in the truck bed, and fixed to one of the frame members 104. The power drive means 160 may be any means capable of providing powered pivotal movement of the article carrier 113. By way of example only, the power drive means in one aspect of the present invention is a motor driven linear actuator including an extensible and retractable member 162 mounted in a tubular housing 164. The output shaft of the drive motor, is coupled by gears, for example, to the extensible member 162 and bi-directionally drives the member 162 between elevated and retracted positions with respect to the housing 164.

A control box 166, mounted at an easily accessible location in the truck bed, provides manually operable control signals by an up/down switch to control the direction of extension or retraction of the member 162 and thereby the movement of the article container 100 and attached tonneau cover 84 between the first storage position shown in FIG. 2 and any of the elevated second positions shown in FIG. 5. A link 168 is coupled at one end to the member 162 and at another end to the article carrier frame member 118. The link 168 transmits extension and retraction movements of the member 162 to pivotal movement of the frame member 118. Due to the rigid interconnected structure of the article frame members 114, 116, 118 and 120, such pivotal movement of the frame member 118 simultaneously causes pivotal movement of the entire frame container 100.

Referring now to FIGS. 7–16, the article container 100, by way of example only, is formed of a plurality of releasable interconnected panels including first and second elongated side panels 174 and 176, each of which are hingedly coupled, by a suitable hinge, to the frame members 116 and 120, a pair of opposed end panels 180 and 182 and a bottom panel 184. As shown in FIG. 3, a pair of overcenter links 186 and 188 are pivotally connected at one end to the end walls 180 and 182 and at another end to the frame members 114 or 118. The links 186 and 188 control extension and collapsing movements of the end panels 180 and 182. FIG. 3 depicts the extended, article storing position of the side panels 174 and 178.

Figure 15:
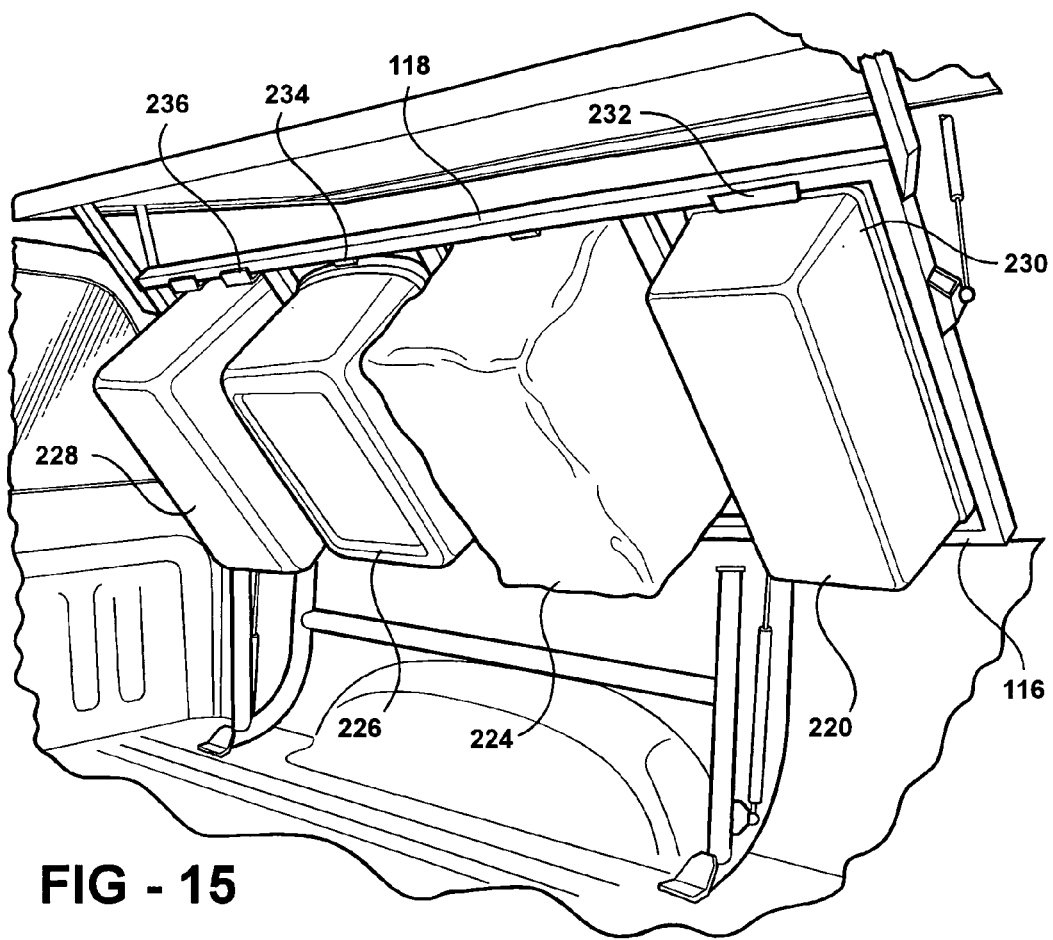
FIG. 15 is an interior, bottom perspective view of the article storage compartment shown in FIG. 14.

Although the various panels 174, 178, 180, 182 and 184 may be fixedly interconnected to form a rigid, non-changeable article container 100, according to one aspect of the present invention, the article container 100 is collapsible to a smaller volume, as shown in FIG. 15, for storage directly beneath the tonneau cover 84 so as to open up larger portions of the interior truck bed beneath the tonneau cover 84 for article storage. As such, adjoining edges of the side panels 174 and 178, the end panels 180 and 182 and the bottom panel 184 are provided with releasable interconnecting portions, such as channels, steps, etc. This enables the side panels 174 and 178 and the end panels 180 and 182 to be disposed in a generally perpendicularly extending downward position from the frame members 114 166, 118 and 120. The bottom panel 184 may be inserted through the frame assembly and secured within complementary portions of lower ends of the side walls 174 and 178 and the end panels 180 and 182 to form a rigid structure for the article container 100 as shown in FIG. 7.

Figure 17:
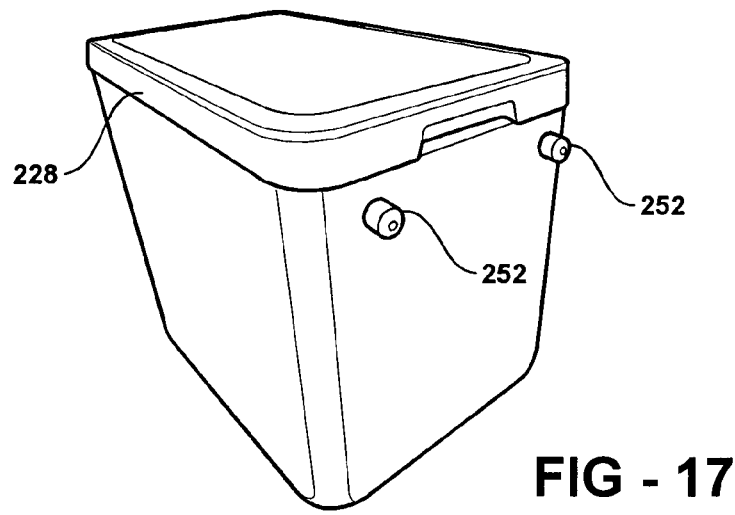
FIG. 17 is an enlarged perspective view of one of the article storage containers shown in FIG. 14.

However, when it is desired to reduce the volume of the article container 100, with the article container 100 pivoted to the second, extended position, the bottom panel 184 is separated from the side panels 174 and 178 and the end panels 180 and 182 and stored on top of the frame assembly as shown in FIG. 17, or on the ground or in the truck bed.

Figure 7:
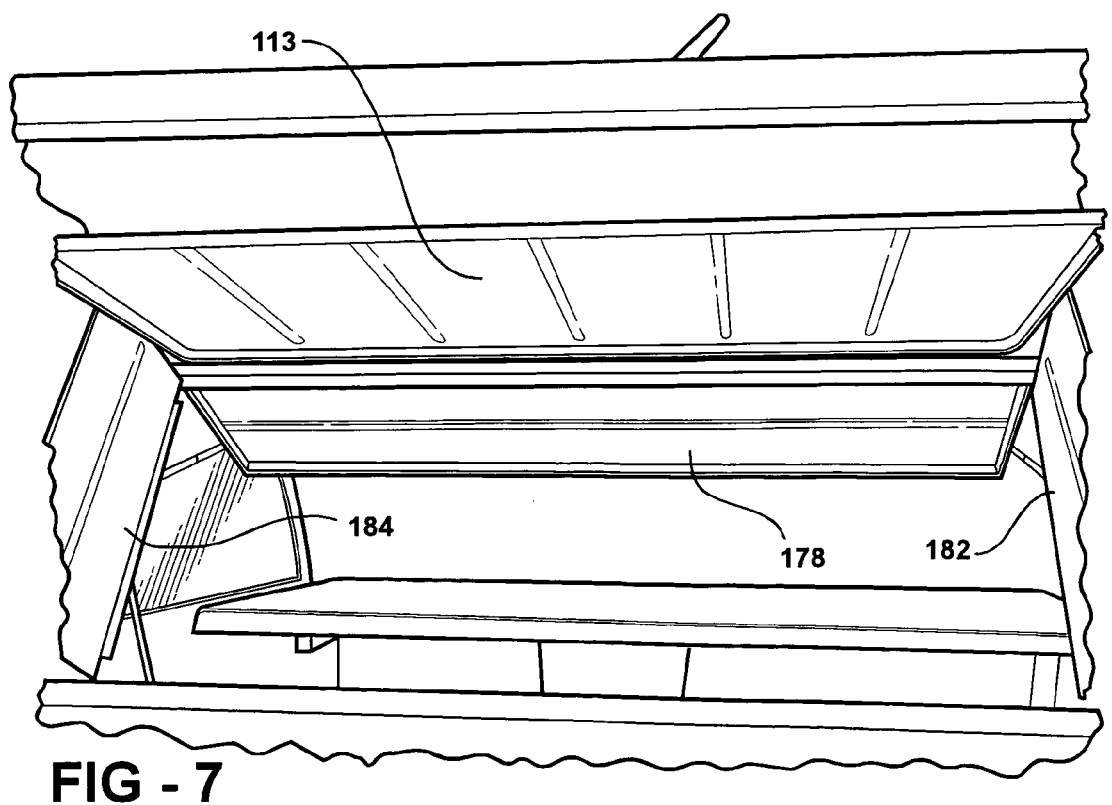
FIGS. 7–11 are sequential perspective views showing the conversion of the expanded, rigid article storage container shown in FIG. 5 into a nested, small volume state.
Figure 8:
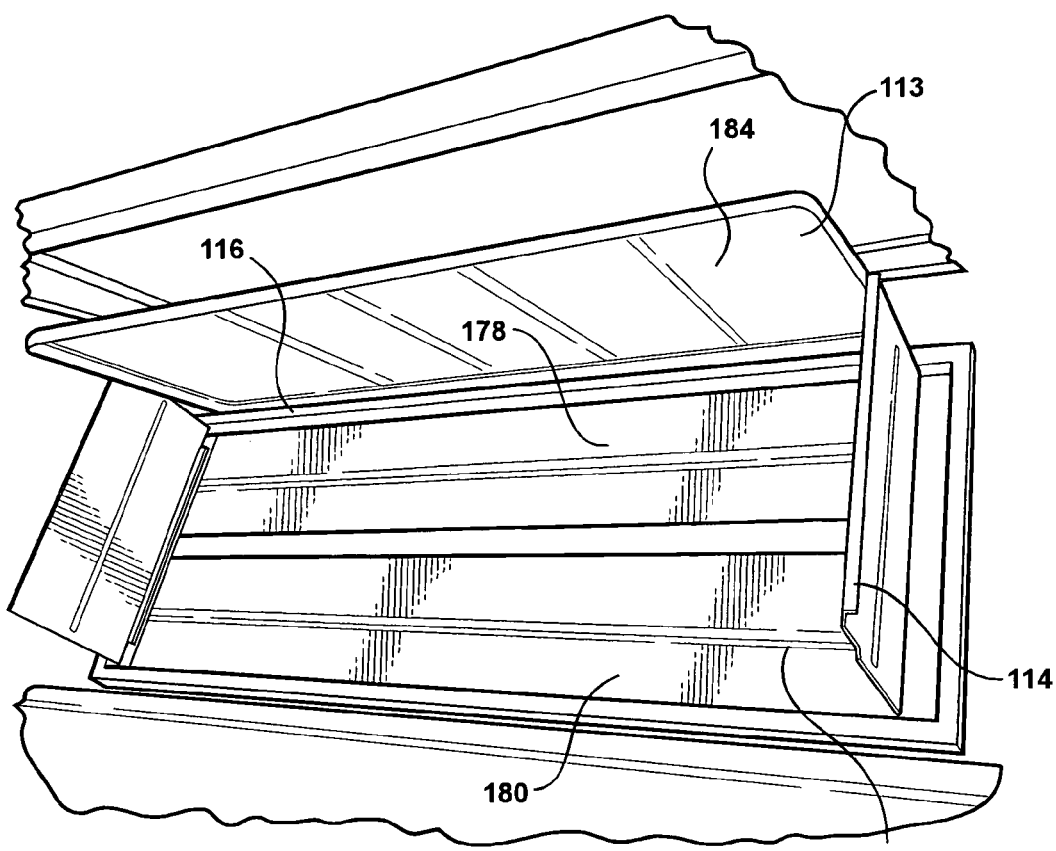
Figure 9:
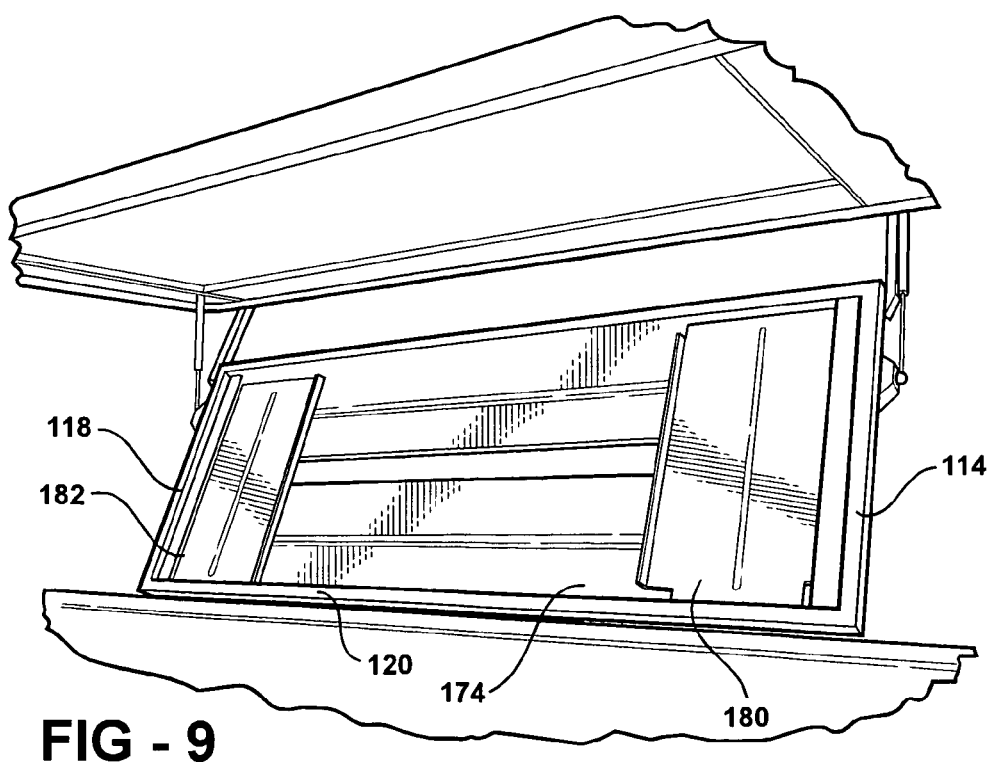
Figure 10:
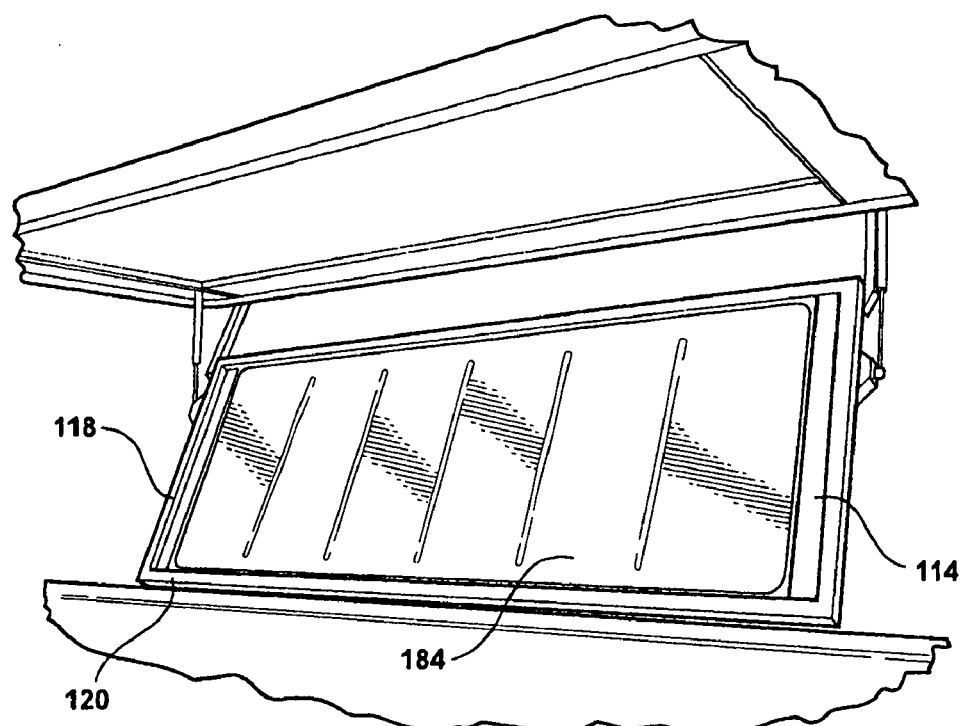
Figure 11:
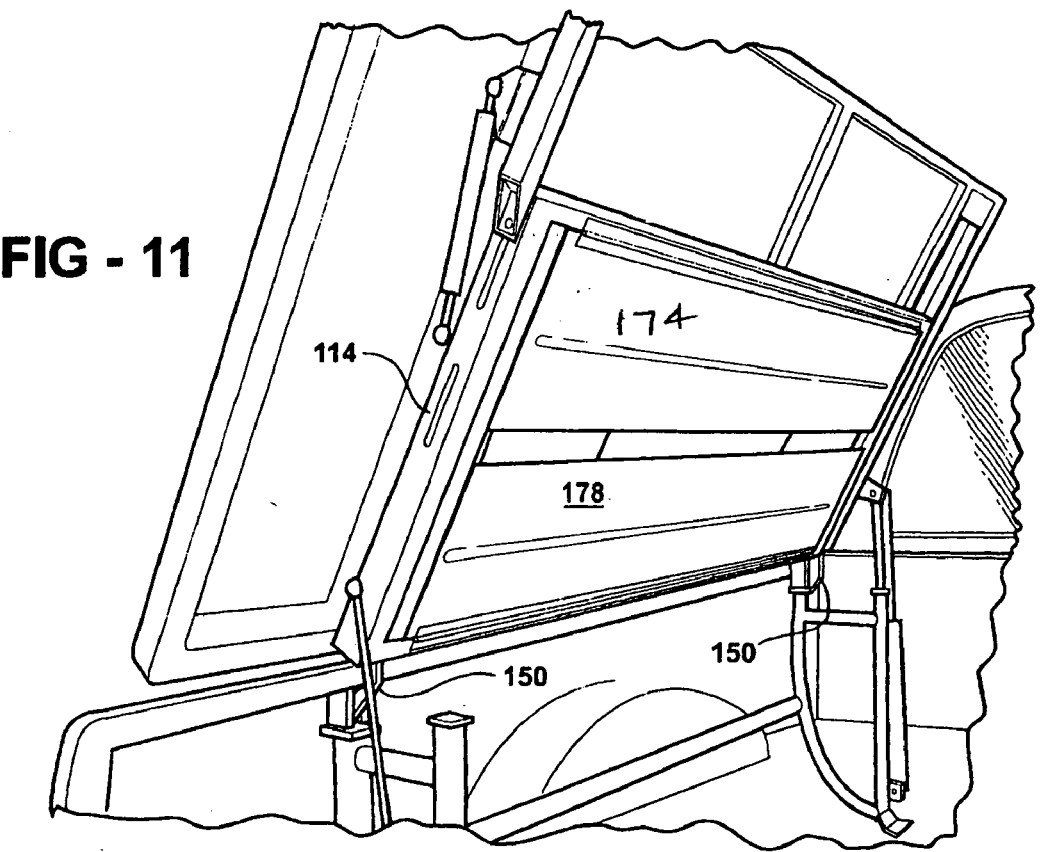

Next, as also shown in FIG. 7, the end panels 180 and 182 are pivoted 180° from their normal storage position about hinges on the frame. The side panels 174 and 178 are then pivoted 90° to a position generally in line with the plane of the frame members 114, 116, 118 and 120 as shown in FIG. 8. The end panels 182 and 184 are next pivoted downward to overlay the side panels 174 and 178 as shown in FIG. 9. The bottom panel 184 is then remounted over the nested end panels 180 and 182 as shown in FIG. 10. The tonneau cover 84 may then be lowered over the frame members 114, 116, 118 and 120 in close proximity to the nested article container 100 as shown in FIG. 11. This minimizes the amount of vertical height between the bottom of the nested or collapsed article container 100 and the truck bed so as to provide additional storage space on the truck bed, even though the tonneau cover 84 is in the lowered position.

Figure 12:
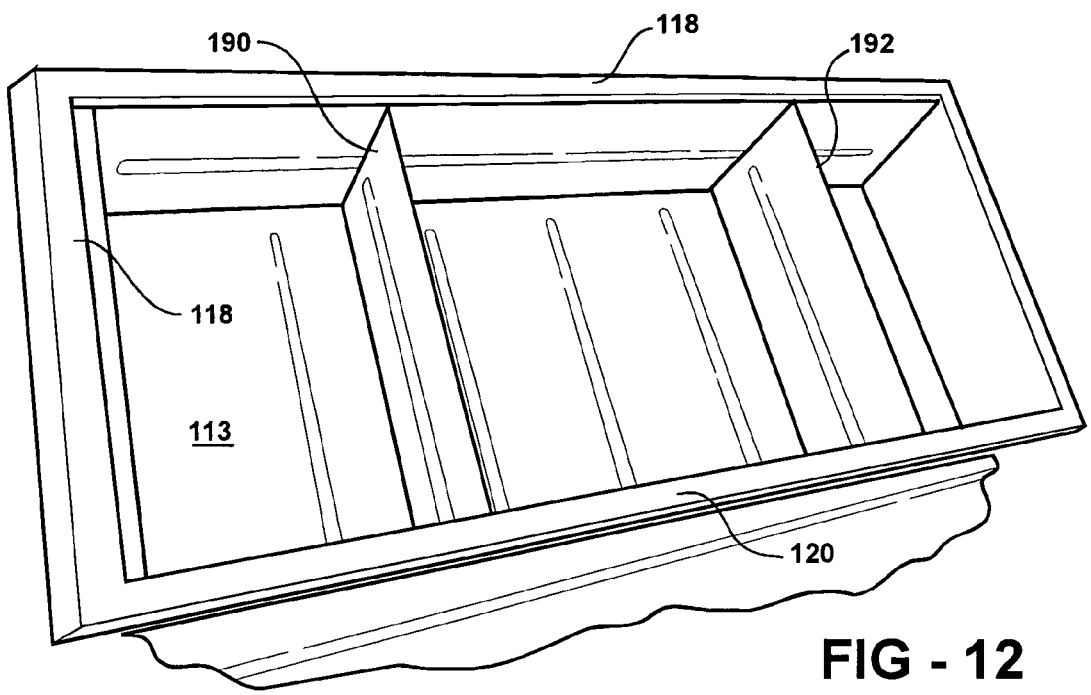
FIG. 12 is a perspective view of the storage compartment with the dividers in an operative position.

Another aspect of the article container 100 is the provision of divider means on the bottom panel 184. As shown in FIGS. 5 and 12, one or more dividers 190 and 192, with two being shown by example only, are pivotally carried by the bottom panel 184. The dividers 190 and 192, which are in the form of small rigid, flexible or mesh panels, which may include carrying handles 194 to facilitate deployment, can be hinged to the bottom panel 184 for movement between a collapsed position shown in FIG. 5 wherein the panels 190 and 192 closely overlay the bottom panel 184 and a second, deployed position at an angle, such as perpendicular, to the bottom panel 184 as shown in FIG. 12. The dividers 190 and 192 thus divide the overall storage compartment into a plurality of sections. This facilitates each section receiving small articles and prevents such articles from large amounts of movement during operation of the truck.

The number of dividers and, thereby, the number of separate sections formed in the article container 100 can be varied as desired.

Further, instead of providing the one or more dividers 190 and 192 hinged to the bottom panel 184, it is also possible to provide separate dividers 190 and 192 which can be stored in other locations, and then inserted into the formed storage container 100 and held in position by means of aligned slots in the side panels 174 and 178, for example.

Figure 13:
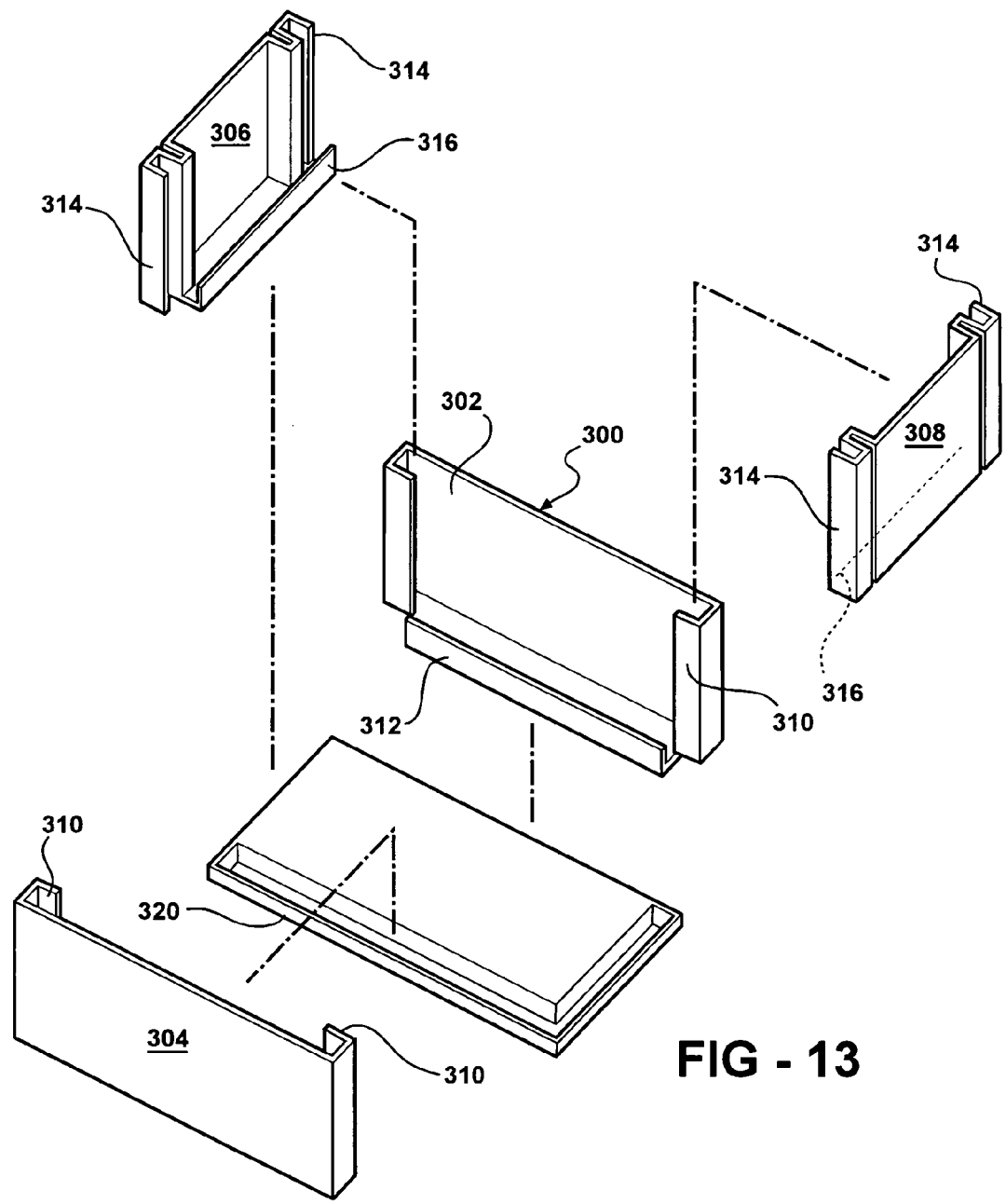
FIG. 13 is an exploded, perspective view of a modified article storage compartment according to the present invention.

Referring now to FIG. 13, there is depicted a modification to the article storage container 100 in which the storage container 300 is formed of opposed side panels 302 and 304, opposed end panels 306 and 308 and a bottom panel 310 which are interconnected into a solid, rigid article storage container as well as being able to be easily collapsed and nested together in a reduced volume, nested position, similar to that shown in FIG. 12.

The side panels 302 and 304 include opposed u-shaped inward facing channels 310 and an upward facing bottom channel 312. The end panels 306 and 308 similarly include opposed end channels 314 and an upward facing bottom channel 316. Preferably, all of the side panels 302 and 304 and the end panels 306 and 308 are handedly coupled to one of the frame members 114, 116, 118 and 120 so as to be pivotal from a downward extending position shown in FIG. 13 and a 90° nested position.

First, starting from the nested position, the side panels 302 and 304 are pivoted 90° to the extended position shown in FIG. 13. The end panels 306 and 308 are then pivoted 90° from the nested position about the respective hinges until the channels 314 engage the channels 310 in the side panels 302 and 304. This forms a four-sided, rigid structure. The bottom panel 310 can then be inserted through the open end of the article container 300 until the U-shaped peripheral flange 320 seats in the bottom channels 312 and 316 of the side panels 302 and 304 and the end panels 306 and 308.

Collapsing of the container 300 to the nested position is effected in an opposite manner by first removing the bottom panel 310 and then alternatingly pivoting upward the end panels 306 and 308 and the side panels 302 and 304.

It will be understood that the article compartments or containers associated with each separate tonneau cover 82 and 84 may be identical. However, by example only, a different article carrier 200 shown in FIGS. 14–17 is associated with the tonneau cover 82. The article carrier 200 includes similar elements as the article container 100, such as a frame formed of interconnected frame members 114, 116, 118 and 120. Lift assist means may be associated with the article frame members 114 and 116 and the article support 104 to facilitate pivotal movement of the entire frame between a first, lowered position shown in FIG. 2 and a pivotal, extended or elevated position shown in FIG. 14. The tonneau cover 82 is pivotally coupled to the frame by the same struts and lift means described above for the article container 100.

Figure 14:
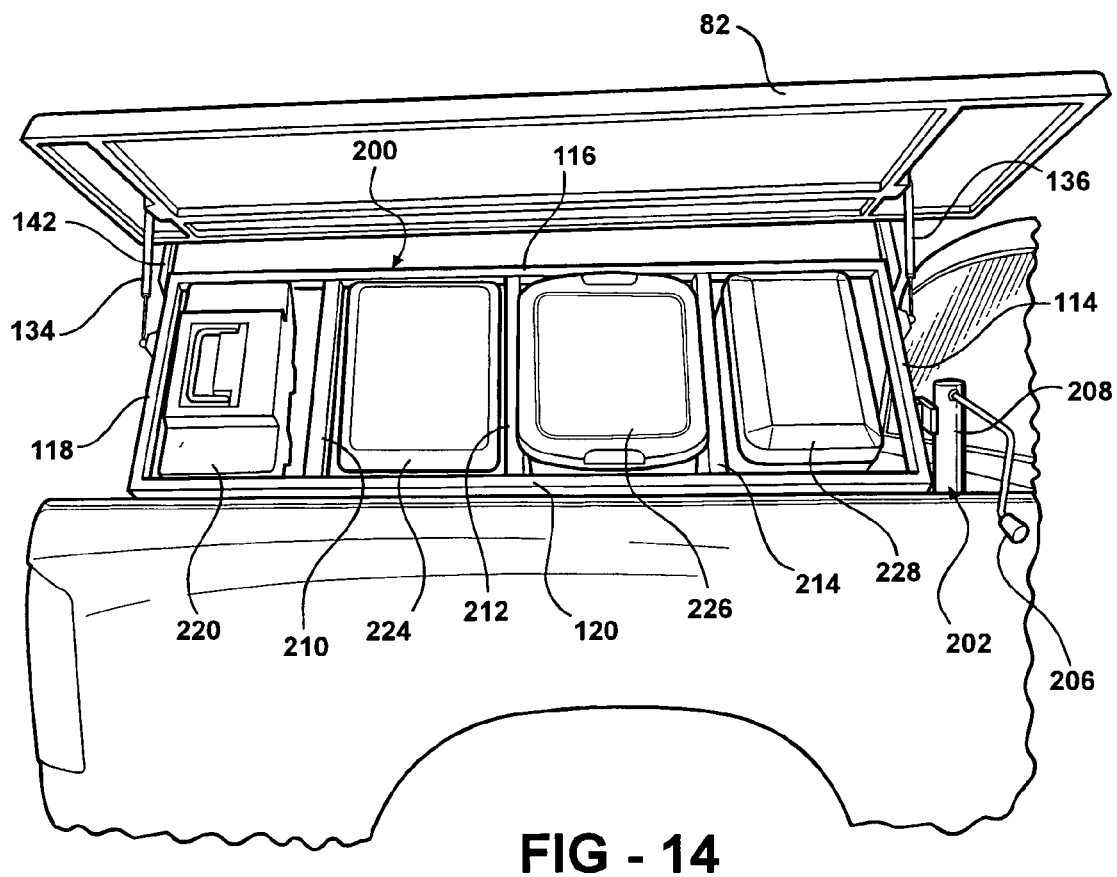
FIG. 14 is a side perspective view showing the elevated position of the other article storage compartment and tonneau cover shown in FIG. 2.

In this aspect of the invention, the article container 200 includes a manually operated moving or elevating means in the form of a jack screw 202 seen in FIG. 14. An extensible or elevatable and retractable portion of the jack screw 202 is fixed by means of a bracket 204 to the frame member 118. A crank 206 rotates a gear housed within the jack screw 202 to linearly extend and retract the extensible portion 208 of the jack screw 202 relative to a fixed portion of the jack screw 202 mounted on the one of the frame supports 104. In this manner, the article container 200 can be pivoted from a first storage position shown in FIG. 1 to a second pivotally elevated position shown in FIG. 14. As the jack screw 202 cannot slip from any position, the article container 200 can remain in any pivoted angle.

As shown in FIG. 14, the tonneau cover 82 may be manually pivoted with respect to the frame members 114, 116, 118 and 120 from a first position closely overlaying the open portion of the article container 200 and a second elevated position opening the interior of the article container 200 to access.

Figure 16:
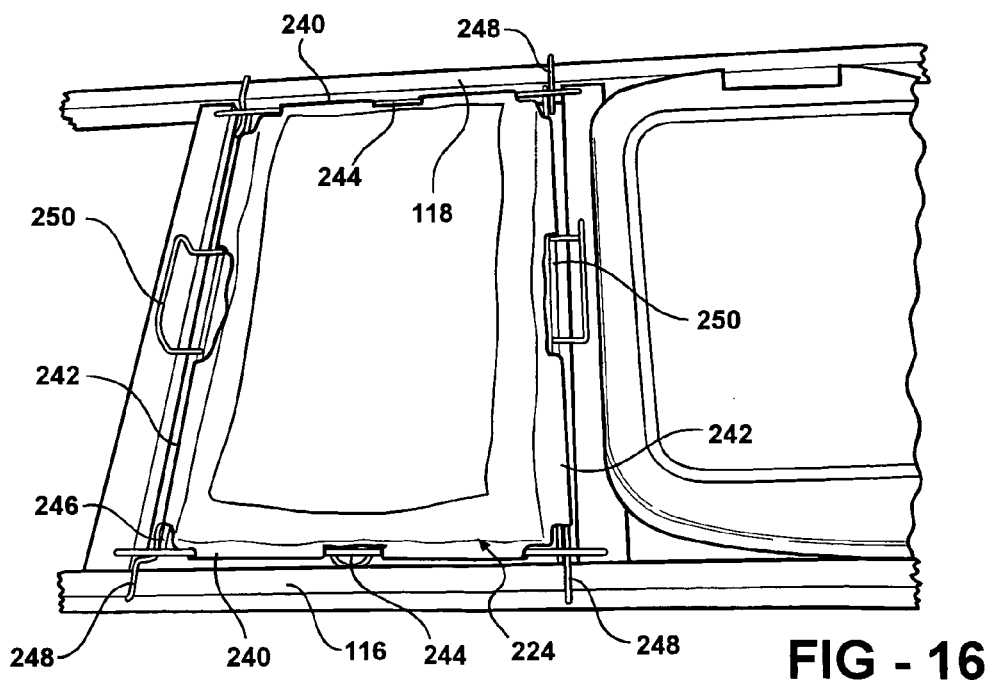
FIG. 16 is an enlarged, partial, perspective view of a portion of the exterior of one article storage container shown in FIG. 20.

In this aspect of the invention, the article storage container includes one or more cross members, with three cross members 210, 212 and 214 being depicted by way of example only in FIGS. 14–16. The space in between the cross members 210, 212, and 214 and the frame members 114 and 116 may be identical, of variable width, etc. The cross members 210, 212, and 214 divide the overall length of the storage compartment between the opposed frame members 114 and 118 into separate sections. Each section, as shown in FIGS. 14 and 15, is devised for receiving, either fixedly or, preferably, releasably, a separate article storage container, with four article storage containers 220, 224, 226, and 228 being depicted by way of example only. The storage containers 220, 224, 226 and 228 may be rigid walled containers, coolers, flexible or mesh-nets or containers, duffel bags, etc. The article containers 220, 224, 226, 228 can be open ended or provided with a cover or lid.

Mounting members are provided on the cross members 210, 212, 214 and the frame members 114 and 116 for releasably supporting the containers 220, 224, 226 and 228 in the article storage compartment 200.

Figure 20:
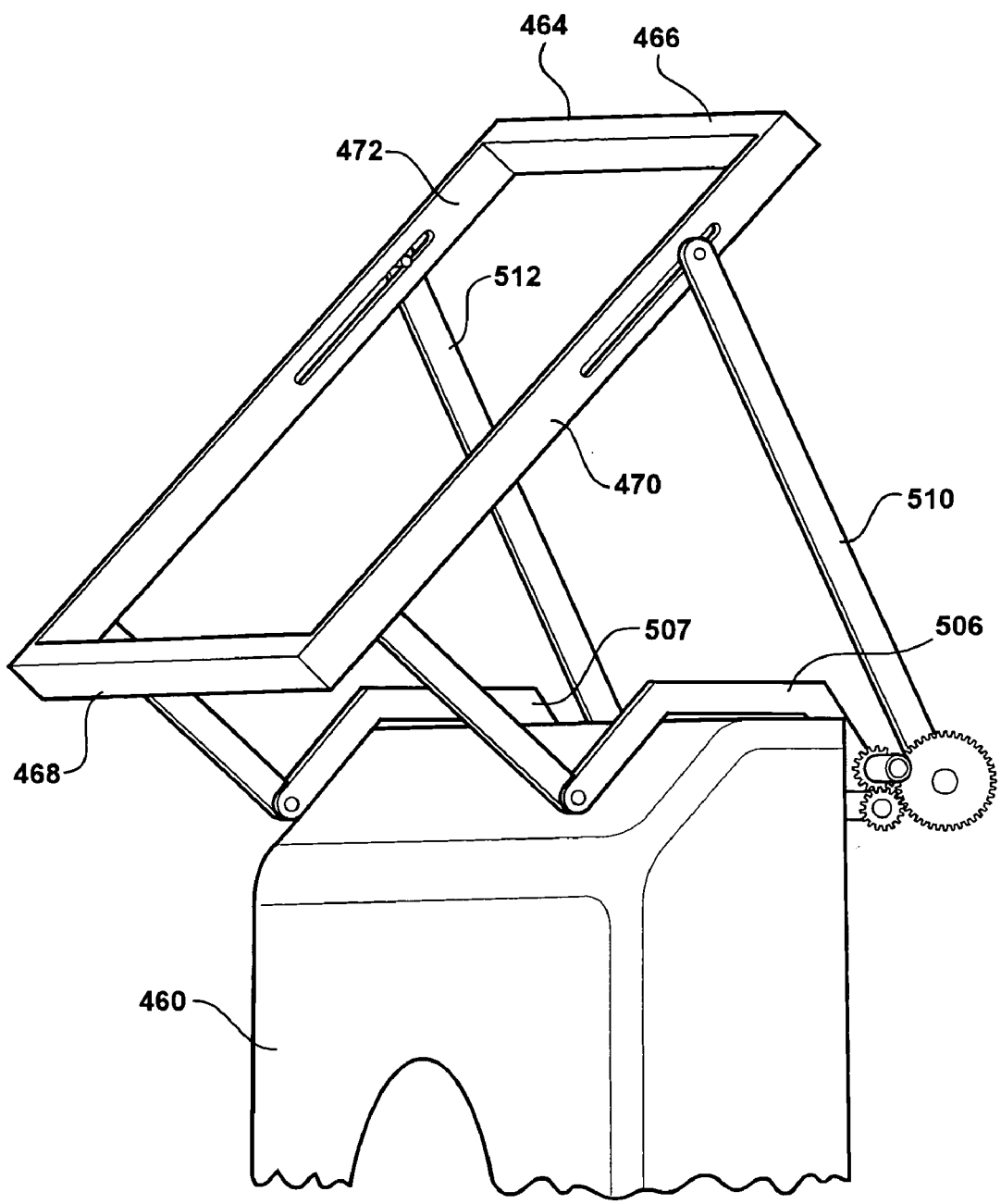

For example, as shown in FIG. 15, the article container 220 is formed as a tub with a peripheral edge flange 230 adjacent an open end. A pair of flanges 232, only one of which is shown in FIG. 20, are fixed to the frame members 116 and 118, by welding or fasteners. The flanges 232 extend inward beyond the innermost extent of the frame members 116 and 118 and act as supports for the flange 230 on the article container 220. Similar flanges 234 and 236 may be provided at other spaced locations along the frame members 116 and 118 to support other flanged article containers 226 and 228.

The article container 224 is in the form of a soft sided, flexible walled container. At least one or a pair of loops 240 are formed on the container 224 at opposite ends as shown in FIG. 16. Similarly, elongated loops 242 are formed along the opposed side edges of the container 224. The loops 240 receive rods 244 and 246. The rods 244 and 246 are removably mounted in supports 248 fixed to the frame members 116 and 118. Handles 250 may be fixed to the rods 246 to facilitate insertion and removal of the article container 224 from the container 220.

FIG. 17 depicts a conventional insulated cooler forming the article container 228. The cooler 228 includes at least one and preferably a pair of outwardly extending end projections 252. The end projections 252 are adapted to be supported on flanges 236 on the frame members 116 and 118.

Instead of the various mounts of flanges described above for removably receiving the various containers 220, 224, 226 and 228, it will be understood that the individual containers 220, 224, 226 and 228 can be provided with outwardly extending hooks or flanges which removably mount over the frame members 114, 116, 118 and 120.

In addition, the container or cooler 228 can be replaced by an electrically powered refrigerator type cooler which operates off the 12 volt electrical system of the truck. An electrical outlet connected to the vehicle battery system can be provided in the truck bed for receiving an electrical cord or conductor extending to such a cooler mounted in the frame of the article container 200. Alternately, power from the motor can be hardwired to the cooler.

A dome light attached to the inside surface of either tonneau cover 82 or 84 can also be hardwired to the vehicle battery or provided with its own battery to provide light into the interior of the containers when the storage compartment is in the elevated position shown in FIG. 4 or 5.

Figure 18:
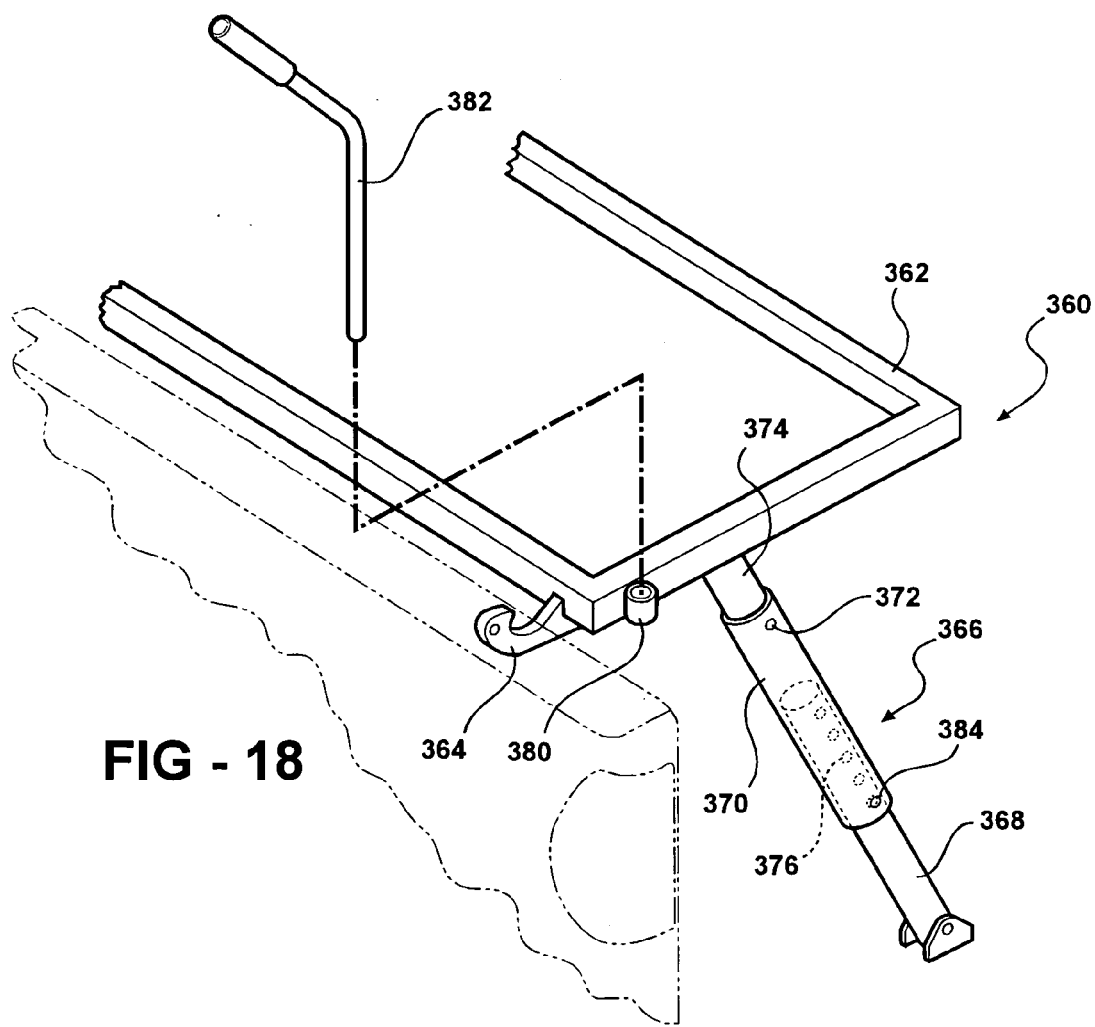
FIG. 18 is a partial, perspective view showing a modified moving means for the article storage apparatus of the present invention.

FIG. 18 depicts yet another aspect of the present invention in which an article storage container 360 also includes a frame assembly 362 which is pivotally mounted by means of pivot 364 to the truck side wall or bed.

In this aspect, an extensible, telescoping tube assembly 366 is provided with telescopingly mounted tube sections 368, one end of which is pivotally mounted to the truck bed and a second section 370 which telescopes within or outside of the first tube 368. The second tube 370 is pivotally connected at pivot point 372 to a flange 374 coupled to one of the frame members of the frame 362.

A plurality of apertures 376 are formed in the telescoping ends of the tube 368 and 370.

Although the article container 360 can be moved upward or downward by any of the drive means described above, including an electric motor driven rack, a hand cranked rack, in this aspect, the moving means includes a tubular sleeve 380 mounted to one of the frame members of the frame 362. The sleeve 380 is sized to removably receive a tilt arm or bar 382. In this manner, the tilt arm 382 when inserted in the sleeve 380, can be used to manually pivot the entire frame 362 upward to the elevated position or to control the downward pivotal movement of the frame 362 by gravity to the lowered position. In both upward and downward pivotal movements, the telescoping tube assembly 366 controls movement of the frame 362. When the frame 362 is in a desired angular position, either full up, full down, or in any angular position therebetween, as long as the apertures 376 are aligned, a lock pin 384 can be inserted through the aligned apertures to lock the article container 360 in the desired position relative to the truck bed.

Figure 19:
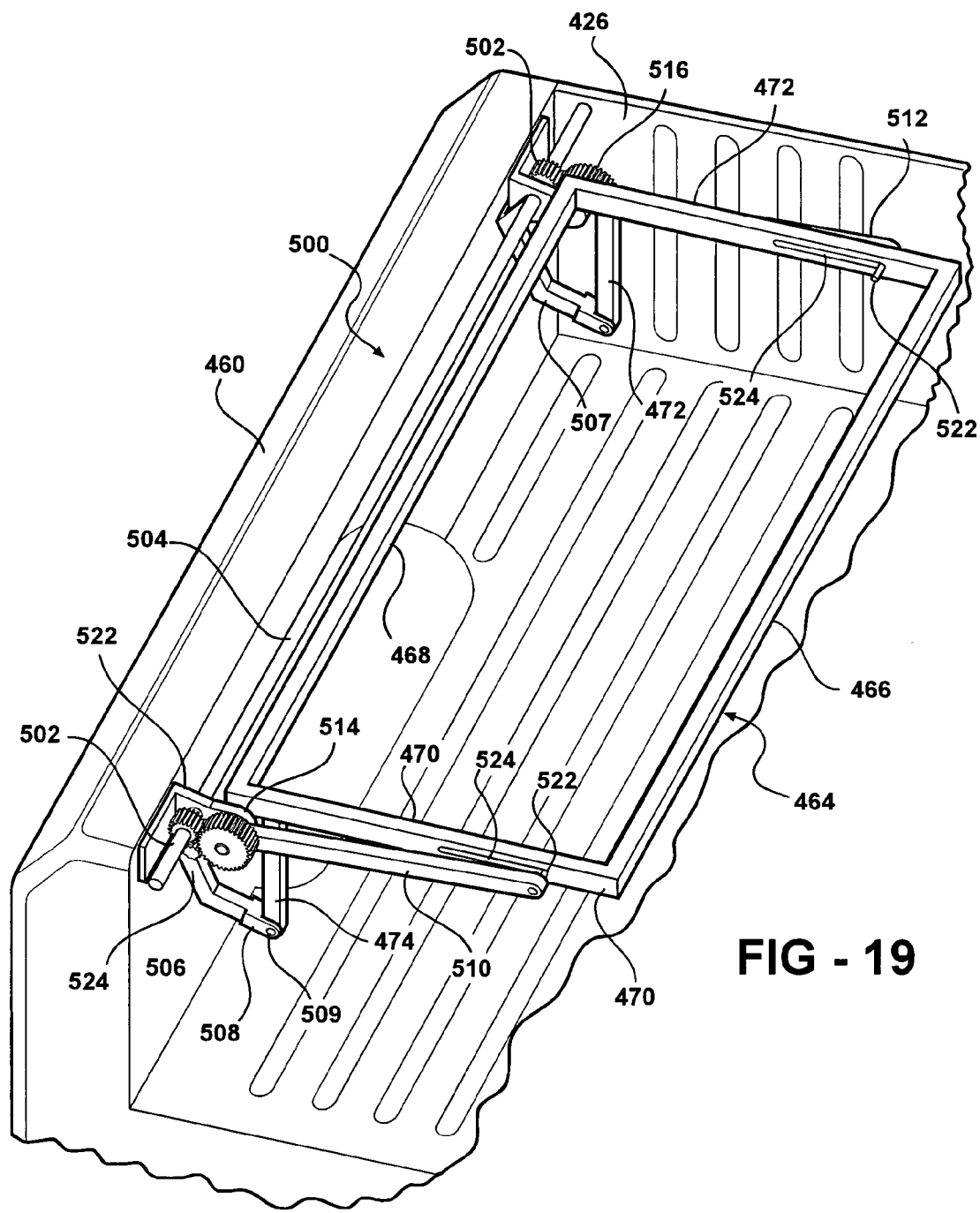
FIGS. 19 and 20 are perspective views of another aspect of a storage compartment according to the present invention.

As shown in FIGS. 19 and 20, another aspect of a storage receptacle or container includes a frame 464 formed of four interconnected frame members or rails 466, 468, 470 and 472. The ends of the rails 466, 468, 470 and 472 are secured together into a generally polygonal form, with the illustrated rectangular form being an example only, by suitable means consistent with the material used to form the rails 466, 468, 470 and 472. When metal rails are employed, the ends of the rails 466, 468, 470 and 472 may be secured together by fasteners, welds, etc. Similar fasteners and heat or sonic welding may be employed in the case of plastic rails 466, 468, 470 and 472. A pair of legs 474 and 476 depend respectively from the rails 470 and 472 at a position spaced from the rail 468.

The rails 466, 468, 470 and 472 form a box-like structure which can receive, in one aspect of the storage container, a plurality of rigid panels.

Referring again to FIGS. 19 and 20, there is depicted a unique storage container elevating and lowering means 500 or mechanism which easily moves the storage container from a storage position shown in FIG. 19 wherein the storage container underlies the tonneau cover when the tonneau cover is in the lowered position and an extended, angularly disposed position with respect to the adjacent truck side panel 460, as shown in FIG. 20, to provide easy access to the interior of the storage container. The elevating means 500 is secured to the inner surface of the truck side panel 460 by means of mounting brackets 502.

The mounting brackets 102, which are welded or secured by means of fasteners to the inner surface of the side panel 460 each have an aperture extending therethrough which receives a tubular drive shaft 504 which rotatable extends between the apertures in the mounting brackets 502. A drive arm 506 is fixed, such as by welding, for example, to each opposite end of the drive shaft 504 and has a generally angular or bent shape to dispose an opposite end 508 in a position for pivotal attachment by means of a pivot pin 509 to a lower end of one of the legs 472 or 474 on the frame 464. The end 508 of the drive arm 506 is slotted so as to enable the end of the side legs 472 or 474 pivotally mounted therein to easily pivot during rotation of the drive shaft 504 and the drive arms 506.

A second pair of drive arms 510 and 512 are respectively associated with the end rails 470 and 472 of the frame 464. One end of each drive arm 510 and 512 is fixedly secured to a shaft 520 on which is fixed a rotatable drive gear 514 and 516, respectively. The shaft 520 is rotatably mounted in one leg of one mounting bracket 502. The other end of each drive arm 510 and 512 carries a pin 522 which rides in a slot 524 in each end rail 470 or 472. The pin 522 allows relative movement between the end of the drive arms 510 and 512 and the associated end rails 470 and 472 while still transmitting lifting force to move the frame 464 from the lowered, stored position shown in FIG. 19, and the elevated, access or open position shown in FIG. 20.

The drive mechanism of the present invention includes a drive gear 522 fixedly mounted on the drive shaft 504 and an idler gear 524 rotatably mounted about a shaft 526 rotatably carried in one leg of one of the mounting brackets 502. The idler gear 524 musingly engages the drive gear 522 and the driven gear 520 to transmit rotation of the drive shaft 504 to the driven gear 516 and thereby to the drive arms 510.

At the same time, rotation of the drive shaft 504 causes pivotal movement of the lower drive arms 506 which effect a pivotal elevating movement of the legs 472 and 474 on the frame 464.

Rotation of the drive shaft 504 may be implemented by a number of different means. For one, a hand crank could be inserted into a suitably formed recess in one end of the drive shaft 504 or the stub shaft 520 carrying the drive gear 514 and rotated in either direction to effect bidirectional pivotal movement of the frame 464 between the lowered and elevated positions.

In the manual crank mode of operation for rotating the drive shaft 504, a lock means can optionally be provided to lock the elevating means in the fully elevated position.

In a motor driven, powered aspect a motor output shaft, not shown, can carry a worm gear which engages the drive gear 514, the idler gear 524 or the drive shaft 504. The worm gear will avoid any back drive and automatically retain the elevating means in any angular position without movement or play.

One or more up and down switches may be used to rotate the drive shaft 504 in the desired direction to elevate or lower the storage container 462. In addition, a remote switch, such as the switch typically carried on a key fob may be used to generate a short range radio frequency signal which is received by a suitable receiver unit, not shown, mounted on the motor, which is used to generate a signal to activate the motor through connection to the vehicle electrical system, to lower or elevate the frame 462 and the container 464 as described above.

As shown in the FIG. 20, the drive shaft 504 is rotated at a direction to elevate the storage container and the frame 464 from the lowered position shown in FIG. 19 to the fully elevated, accessible position shown in FIG. 20. During this pivotal movement, the ends of the upper drive arms 510 and 512 which are slidably connected by the pins 522 and the slots 524 to the end rails 470 and 472, respectively, traverse the length of the slots 524 from an outer end to an inner end during the initial angular movement of the frame 464 from the fully lowered position toward the elevated position.

As the drive shaft 504 continues to rotate in the direction to elevate the frame 464, the pins 522 in the ends of the upper drive arms 510 and 512 will reverse direction and slide back along the slots 524 toward the opposite end of the slots 524 until the pins 522 are disposed adjacent to the opposite ends of the slots 524. In this position, it should be noted that the lower drive arms 506 and 508, due to their angular or curved shape, wrap around the outer upper surface of the truck side panel 460, preferably without coming into contact with the exterior surface of the side panel 460. However, the lower drive arms 506 and 508 are moved to a position which places the side rails 466 and 468 in an easily accessible position adjacent the upper edge of the side panel 460 allowing free and easy access to the contents of the storage container 462 supported by the frame 464 without requiring the user to climb into the truck bed as is previously required in prior truck bed mounted storage containers.

In another aspect of the invention, a biasing means, such as a spring or a gas assist shock, not shown, may be mounted between one or more of the rails of the frame 464 and opposed portions of the tonneau cover to assist in pivotal upward movement of the tonneau cover relative to the frame 464 to open the open end of the frame 464 and container 462 to access. Suitable hinges may be employed to mount the gas assist shock to the frame rails and the tonneau cover.

What is claimed is:

1. An article storage apparatus for a truck having side walls extending from a truck bed, the apparatus comprising:
   a storage compartment mountable over a truck bed, the storage compartment having a first side edge disposed adjacent one sidewall of the truck bed and an opposed second side edge disposed laterally inward of the first side edge;
   means, coupled to the storage compartment and the truck bed, for moving the storage compartment between a first storage position with respect to the truck bed and a second position elevated from the first position, wherein, in the second position, the second side edge of the storage compartment is disposed above a plane extending between the tops of the sidewalls of the truck bed to allow easy access to an interior of the storage compartment; and
   a cover coupled to and movable with the storage compartment, the cover movably closing an open portion of the storage compartment.

2. The apparatus of claim 1 wherein the moving means further comprises:
   pivot means for pivotally mounting the storage compartment to a truck.

3. The apparatus of claim 1 wherein the storage compartment comprises:
   a frame; and
   at least one storage compartment.

4. An article storage apparatus for a truck having side walls extending from a truck bed, the apparatus comprising:
   storage compartment means, mountable over a truck bed; and
   means, coupled to the storage compartment means, for moving the storage compartment means between a first storage position with respect to the truck bed and a selectable second position elevated from the first position to allow easy access to an interior of the storage compartment means;
   the storage compartment means including:
   a frame;
   at least one storage compartment; and
   movement assist means, coupled to the frame, for assisting movement of the frame between the first and second position.

5. The apparatus of claim 4 wherein the movement assist means comprises:
   at least one pressurized gas cylinder coupled to the frame.

6. An article storage apparatus for a truck having side walls extending from a truck bed, the apparatus comprising:
   storage compartment means, mountable over a truck bed; and
   means, coupled to the storage compartment means, for moving the storage compartment means between a first storage position with respect to the truck bed and a selectable second position elevated from the first position to allow easy access to an interior of the storage compartment means;
   the moving means including:
   a rack stationarily positioned with respect to the storage compartment means, the rack including an extensible member coupled to the storage compartment means;
   a driven gear coupled to the rack; and
   an electric motor coupled to the driven gear for bi-directionally moving the extensible member of the rack.

7. An article storage apparatus for a truck having side walls extending from a truck bed, the apparatus comprising:

storage compartment means, mountable over a truck bed; and means, coupled to the storage compartment means, for moving the storage compartment means between a first storage position with respect to the truck bed and a selectable second position elevated from the first position to allow easy access to an interior of the storage compartment means, the moving means including:

a rack coupled to the storage compartment means, the rack having an extensible member; and a manually operated crank for bi-directionally moving the rack.

8. The apparatus of claim 1 wherein:
the second position is one of a variably selectable plurality of discrete second positions.

9. The apparatus of claim 1 wherein the moving means comprises:
a receiver coupled to a pivotal frame supporting the storage compartment; and
a lift bar removably insertable in the receiver for manually pivoting the frame.

10. The apparatus of claim 1 wherein the storage compartment comprises:
a rigid, fixed shape storage compartment.

11. An article storage apparatus for a truck having side walls extending from a truck bed, the apparatus comprising:
storage compartment means, mountable over a truck bed, the storage compartment means including a collapsible storage compartment; and
means, coupled to the storage compartment means, for moving the storage compartment means between a first storage position with respect to the truck bed and a selectable second position elevated from the first position to allow easy access to an interior of the storage compartment means.

12. The apparatus of claim 11 wherein the storage compartment comprises:
a plurality of inter-engagable panels.

13. The apparatus of claim 12 wherein:
the panels are nestable in a frame, the frame supporting the storage compartment.

14. The apparatus of claim 12 wherein:
certain ones of the panels are hinged to the frame.

15. An article storage apparatus for a truck having side walls extending from a truck bed, the apparatus comprising:
storage compartment means, mountable over a truck bed; and
means, coupled to the storage compartment means, for moving the storage compartment means between a first storage position with respect to the truck bed and a selectable second position elevated from the first position to allow easy access to an interior of the storage compartment means, the storage compartment means including:
a frame having at least one open section; and
a removable storage container mountable in the at least one open section.

16. The apparatus of claim 15 further comprising:
mounts carried on at least one of the frame and the storage container for releasably supporting at least one storage container in the at least one section of the frame.

17. The apparatus of claim 1 wherein the storage compartment further comprises:
a storage compartment having at least a bottom wall, at least one side wall, and an open top end formed by the at least one side wall; and divider means, positionable within the storage compartment, for dividing the interior of the storage compartment into at least two separate sections.

18. An article storage apparatus for a truck having side walls extending from a truck bed, the apparatus comprising:
storage compartment means, mountable over a truck bed; and
means, coupled to the storage compartment means, for moving the storage compartment means between a first storage position with respect to the truck bed and a selectable second position elevated from the first position wherein in the second position the second side edge of the storage compartment is disposed above a plane extending between the tops of the sidewalls of the truck bed to allow easy access to an interior of the storage compartment means, the storage compartment means further including:
a storage compartment having at least a bottom wall, at least one side wall, and an open top end formed by the at least one side wall; and
divider means, positionable within the storage compartment, for dividing the interior of the storage compartment into at least two separate sections, the divider means being pivotally carried by at least one of the bottom wall and the at least one side wall of the storage compartment.

19. The apparatus of claim 1 wherein the cover comprises:
a tonneau pivotally connected to the storage compartment and moveable from a first position overlaying the storage compartment and a second position spaced from and opening the interior of the storage compartment to access.

20. The apparatus of claim 19 further comprising:
article carrier means carried exteriorly on the tonneau cover.

21. An article storage apparatus for a truck having side walls extending from a truck bed, the apparatus comprising:
storage compartment means, mountable over a truck bed;
means, coupled to the storage compartment means, for moving the storage compartment means between a first storage position with respect to the truck bed and a selectable second position elevated from the first position to allow easy access to an interior of the storage compartment means;
a tonneau pivotally connected to the storage compartment and moveable from a first position overlaying the storage compartment and a second position spaced from and opening the interior of the storage compartment means to access; and
article carrier means carried on the tonneau, the article carrier means including an open-ended channel integrated with the tonneau.

22. The apparatus of claim 21 further comprising:
tie-down means, carried on the tonneau, for releasably securing an article in the article carrier means.

23. The apparatus of claim 19 further comprising:
movement assist means coupled between the tonneau and the storage compartment, for assisting movement of the tonneau between the first and second positions.

24. The apparatus of claim 1 wherein the storage compartment comprises:
a pair of separate storage compartments, each moveably mountable to the truck bed.

25. The apparatus of claim 1 further comprising:
the storage compartment including a frame;
at least one article compartment supported by the frame; and a tonneau cover pivotally connected to the storage compartment and moveable from a first position overlaying the storage compartment and a second position spaced from and opening the storage compartment to access.

26. The apparatus of claim 1 further comprising:
   the storage compartment including a frame and a storage compartment;
   the moving means including a rack stationarily positioned with respect to the storage compartment and including an extensible member;
   a driven gear engaged with the rack; and
   an electric motor driving by coupled to the driven gear for bi-directionally moving the extensible member of the rack.

27. The apparatus of claim 1 wherein the storage compartment includes:
   a frame; and
   a storage compartment;
   the moving means includes:
      a movable rack coupled to the storage compartment; and
      a manually operated crank coupled to the rack for bi-directionally moving the rack.

28. A tonneau cover for a truck having side walls extending from a bed, the tonneau cover comprising:
   at least one panel pivotally disposed with respect to a truck bed and side wall of a truck for movement between a first position covering at least a portion of the truck bed and a second position angularly disposed from the truck bed to open at least a portion of the truck bed; and
   article carrier means carried exteriorly on the tonneau cover.

29. A tonneau cover for a truck having side walls extending from a bed, the tonneau cover comprising:
   at least one panel pivotally disposed with respect to a truck bed and side wall of a truck for movement between a first position covering at least a portion of the truck bed and a second position angularly disposed from the truck bed to open at least a portion of the truck bed; and
   article carrier means carried on the tonneau cover, the article carrier means including a channel extending out of a plane of the panel.

30. A tonneau cover for a truck having side walls extending from a bed, the tonneau cover comprising:
   at least one panel pivotally disposed with respect to a truck bed and side wall of a truck for movement between a first position covering at least a portion of the truck bed and a second position angularly disposed from the truck bed to open at least a portion of the truck bed; and
   article carrier means carried on the tonneau cover, the article carrier means, including a channel extending below a plane of the panel.

31. The apparatus of claim 28 wherein the article carrier means comprises:
   an open-ended channel integrated with the panel.

32. A tonneau cover for a truck having side walls extending from a bed, the tonneau cover comprising:
   at least one panel pivotally disposed with respect to a truck bed and side wall of a truck for movement between a first position covering at least a portion of the truck bed and a second position angularly disposed from the truck bed to open at least a portion of the truck bed;
   article carrier means carried on the tonneau cover; and
   tie-down means, carried on the panel, for releasably securing an article in an article carrier means.

33. The tonneau cover of claim 28 wherein the at least one panel comprises:
   a pair of panels each individually pivotally mountable with respect to the truck bed.

* * * * *